3,640,972
Patented Feb. 8, 1972

3,640,972
ADHESIVE COMPOSITIONS COMPRISING 2-CY-
ANOACRYLATES AND HETEROCYCLIC COM-
POUNDS
Bernard Joseph Bolger, 47 Kilterogh Road, Foxrocks,
and Denis Joseph O'Sullivan, 130 St. Finton's Road,
Sutton, both of Dublin, Ireland
No Drawing. Filed June 6, 1969, Ser. No. 831,254
Claims priority, application Ireland, Aug. 18, 1968,
1,006/68
Int. Cl. C08f 3/50, 3/74, 15/16
U.S. Cl. 260—78.4 N          20 Claims

ABSTRACT OF THE DISCLOSURE

Improvements are made in the cure speed and bond performance of cyanoacrylate adhesives by using in conjunction therewith an imino- or unsaturated aliphatically substituted derivative of s-triazine, hexahydro-s-triazine or pyrimido [5,4-d] pyrimidine.

BACKGROUND OF THE INVENTION

It is known to use copolymer-forming additives in cyanoacrylic acid ester compositions. Examples of these include diallylphthalate, the acrylic monomers such as methyl methacrylate and acrylonitrile, which also dilute the cyanoacrylate esters and thereby render the adhesive compositions less expensive. But the use of the heterocyclic compounds of the present invention as polymerization accelerators is believed to be novel, as is their use as copolymer-forming additives, that is to say bond strength reinforcers. Compounds which accelerate polymerization of cyanoacrylate monomers usually have the unwanted side-effect of weakening the bond formed.

This invention relates to adhesive composition of the type containing monomeric esters of 2-cyanoacrylic acid, wherein the esters polymerize after application to the surfaces to be joined, so as to form an adhesive bond. It is particularly concerned with the incorporation into the adhesive compositions of certain heterocyclic compounds capable of taking part in and accelerating the polymerization reactions to yield copolymers with the 2-cyanoacrylic acid esters, such as copolymers often possessing crosslinked lattices and forming effective adhesive bonds within a few seconds of the establishment of contact between the surfaces to be joined.

The invention may be applied to the improvement of any adhesive compositions containing monomeric esters of 2-cyanoacrylic acid, but is particularly well adapted to the improvement of adhesive compositions containing sultones, as stabilizers or for other purposes, preferably in a proportion in excess of 1% by weight of composition, such as those compositions described in copending United States patent application Ser. No. 28,543, filed Apr. 14, 1970, a continuation in part of Ser. No. 771,612, filed Oct. 10, 1968, now abandoned.

While the inventors do not wish to be bound to any particular theory, the weak-bond formation with prior art accelerators is believed to occur because these accelerators do not appear to permit ordered molecular orientation of the cyanoacrylate monomer at the interface between adhesive and the surfaces to be joined before hardening has taken place. The heterocyclic compounds used in the present invention surprisingly do not exhibit this defect. While again not wishing to be bound to any particular theory, it is believed their interaction with the dipoles of the —CN groups in the cyanoacrylate during polymerization encourages ordered orientation of the polymer and this is thought to underlie the enhanced strength characteristic of bonds formed by the adhesive compositions of the invention.

THE INVENTION

The present invention comprises adhesive compositions containing monomeric esters of 2-cyanoacrylic acid and also containing, or being associated in a two-part composition with, at least one di-, tri- or tetra-substituted heterocyclic compound selected from imino- and unsaturated aliphatically-substituted derivatives of s-triazine, hexahydro-s-triazine and pyrimido [5,4-d] pyrimidine, such derivatives having one of the Formulae I, II and III, respectively:

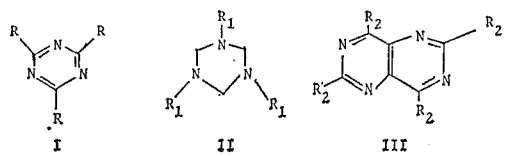

in which the substituent groups R and $R_2$ represent either the iminoethylene group, i.e.,

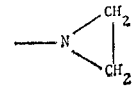

or an unsaturated aliphatic residue, preferably containing less than about six carbon atoms, and most preferably the following:

—$CH_2$—CH=$CH_2$
—O—CH=$CH_2$
—O—$CH_2$—CH=$CH_2$
—O—CH=CHCl
—O—CH=CH—$CH_2$Cl, and
—$SO_2$—CH=$CH_2$ $R_1$ represents an unsaturated aliphatic residue, preferably containing less than about six carbon atoms and most preferably selected from the following:

—CO—CH=$CH_2$
—CO—CCl=$CH_2$
—$CH_2$—CH=$CH_2$, and
—$SO_2$—CH=$CH_2$ provide a maximum of one of the R or $R_1$ radicals and two of the $R_2$ radicals in a given compound also may be hydrogen, i.e. so as to preserve at least di-substitution by imino-ethylene or unsaturated aliphatic groups. Naturally, nonmaterial variations in the above described heterocyclic compounds can be made without deviating from the spirit and broad scope of this invention. Tri- or, where possible, tetra-substitution is preferred in that it favors cross-linkage during polymerization. The substituted s-triazines of preference are 2,4,6-triethyleneimino-s-triazine, also known as triethylenemelamine, of Formula IV,

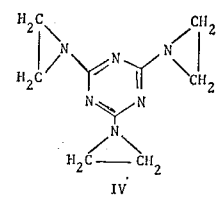

and 2,4,6-triallyloxy-s-triazine, commonly known as triallyl cyanurate. The substituted pyrimido [5,4-d] pyrimidines of preference are 2,4,6,8-tetraethyleneiminopyrimido [5,4-d] pyrimidine and 2,4,6,8-tetra-allyloxypyrimido [5,4-d] pyrimidine.

The present invention also provides a two-part adhesive composition which comprises an adhesive composition of the type described herein in a first container, and, associated therewith, at least one heterocyclic compound as hereinbefore defined, preferably dissolved or dispersed in an organic solvent, in a second container.

The present invention further provides a process for the preparation of an adhesive composition, which process comprises intimately associating a cyanoacrylate adhesive composition of the type described herein, with at least one heterocyclic compound as hereinbefore defined, by standard means such as mixing, dissolving or homogenizing.

Also contemplated within this invention is a process for bonding surfaces which comprises applying to either the cyanoacrylate composition or at least one of the surfaces to be bonded, a heterocyclic compound as hereinbefore described, applying the cyanoacrylate composition to at least one of the surfaces to be bonded, and placing the surfaces so treated in contact until all or a portion of the cyanoacrylate composition has hardened to bond the surfaces together.

DISCUSSION OF THE INVENTION AND ITS PREFERRED EMBODIMENTS

As indicated above, the adhesive composition contemplated for use herein comprises at least one monomeric ester of 2-cyanoacrylic acid. Generally, the ester corresponds to the general formula

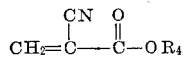

where $R_4$ is a $C_1$ to $C_{16}$ alkyl, cyclohexyl or phenyl group. As is known in the art, adhesives of this type can contain stabilizers, such as sulfones, sulfur dioxide and hydroquinone, thickeners, such as polymethyl methacrylate, plasticizers, such as dioctyl sebacate, and various minor ingredients such as dyes, diluents, etc. All adhesive compositions of this type may be used effectively with the heterocyclic compounds described herein, and hence are within the broad scope of this invention.

In those adhesive compositions of the present invention wherein R or $R_2$ of the heterocyclic compound is the iminoethylene group, the heterocyclic compound invariably is presented in the second part of a two-part composition, the first part containing the cyanoacrylate adhesive. This is so because iminoethylene-substituted triazines and pyrimido-pyrimidines accelerate the polymerization of all or nearly all cyanoacrylate adhesives so drastically that they must be kept separated until near the time of intended use.

Any amount of heterocyclic compound found effective with the particular cyanoacrylate adhesive in the particular application desired, may be used. Generally, this amount lies between about 0.1% and about 20% by weight of the adhesive composition, and preferably lies between about 1% and about 5%. This proportion holds irrespective of whether the heterocyclic compounds are mixed with the composition yielding a one-part product, or are alternatively presented in a separate container to yield a two-part product. When a two-part product is used, the heterocyclic compound of the invention is preferably presented as a solution or dispersion in acetone or other appropriate organic solvent, the concentration of which is not critical but conveniently may lie between about 1% and about 5% of heterocyclic compound by weight of solution. The weight ratio of the second part to the first, in a two-part composition, is not critical, but commonly will be between about 0.01 to 1 and about 1 to 1.

Compositions prepared according to the present invention yield satisfactory adhesive bonds between pairs of clean surfaces of wood, pottery, ceramic materials generally, glass, metals and synthetic resins having suitably hard surfaces, such pairs of surfaces being either of the same or of different materials. Most non-olefin polymer resins have suitably hard surfaces.

These compositions exhibit considerably increased speed of cure (and this is a notable feature of the present invention) and increased water-resistance and resistance to aging. Wood-to-wood and steel-to-steel adhesive bonds may be effected therewith in a matter of a few seconds with moderate pressure applied, and substantially full cure is obtained in a few minutes.

These compositions may be used with a minimum of prior preparation of the surfaces to be bonded, whereas with previously known adhesive compositions based on 2-cyanoacrylic acid esters it was necessary to pre-treat the surfaces by scrupulous cleaning, degreasing, sandblasting or similar processes.

A noteworthy increase in speed of cure in the particular case of adhesive bonds between surfaces at least one of which is steel or wood is a further advantageous feature of the present invention.

The particular two-part adhesive compositions of the present invention in which R or $R_2$ is the iminoethylene group, while possessing all the advantages claimed for the compositions of the present invention in general, are further characterized by (a) an increased speed of cure, (b) improved bond strength and (c) an excellent metal-to-paint bond, as illustrated below in Example 2.

The invention will be better understood by reference to the following specific examples, which are illustrative only and are not intended to limit in any way the scope of the invention described herein.

EXAMPLES

Example 1

An adhesive composition was prepared consisting of 98.99% by weight methyl-2-cyanoacrylate monomer, 0.01% by weight p-tert-butylcatechol, and 1.00% by weight propane sultone. 99 parts by weight of this composition were intimately mixed with 1 part by weight of triallylcyanurate. This mixture was applied in a thin film to two surfaces of solvent cleaned, but otherwise untreated, mild steel. The thus treated surfaces then were placed in mutual contact and held together by manually applied pressure for 10 seconds. This gave an adhesive bond whose strength was immediately determined and found to be 2000 lbs./sq. in tensile lap shear.

Example 2

An adhesive composition was prepared in two parts as follows: Part one consisted of 99.49% by weight methyl-2-cyanoacrylate monomer, 0.01% by weight p-tert-butylcatechol, and 0.50% by weight propane sultone. Part two consisted of a 1% solution in acetone of triethylenemelamine. The two-part adhesive so prepared then was used to bond a flat rectangular sheet of mild steel face to face to an enamelled mild steel surface. The surfaces were solvent cleaned but otherwise untreated.

Both surfaces were "primed" by brushing with a thin coat of part two, the triethylenemelamine solution. After allowing about thirty seconds for the acetone to evaporate, a thin coat of part one, the cyanoacrylate adhesive, was brushed onto each of the "primed" surfaces. The surfaces immediately were placed in mutual contact using hand pressure for 5 seconds. A strong, durable adhesive bond was obtained.

We claim:

1. An adhesive composition presented in at least one part which consists essentially of: (A) at least one monomeric ester of 2-cyanoacrylic acid and (B) at least one heterocyclic compound selected from the group consisting of heterocyclic compounds of the following formulae:

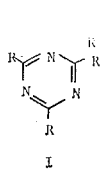 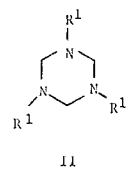 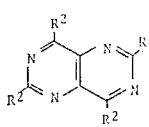

I    II    III wherein each $R^1$ radical is selected from the group consisting of: hydrogen; unsaturated aliphatic residues containing less than about 6 carbon atoms;

—CO—CH=CH$_2$

—CO—CCl=CH$_2$; and —SO$_2$—CH=CH$_2$; provided at least two of the $R^1$ groups are other than hydrogen; and each R and $R^2$ radical is selected from the group consisting of: hydrogen; unsaturated aliphatic residues containing less than about 6 carbon atoms; —O—CH=CH$_2$; —O—CH$_2$—CH=CH$_2$; —O—CH=CHCl;

—O—CH=CH—CH$_2$Cl

—SO$_2$—CH=CH$_2$; and

provided at least two of the R and $R^2$ groups are other than hydrogen.

2. The adhesive composition of claim 1 wherein the ester of 2-cyanoacrylic acid corresponds to the formula

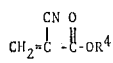

wherein $R^4$ is a $C_1$ to $C_{16}$ alkyl, cyclohexyl or phenyl group.

3. The adhesive composition of claim 1 wherein the heterocyclic compound is 2,4,6-triethyleneimino-s-triazine.

4. The adhesive composition of claim 1 wherein the heterocyclic compound is 2,4,6-triallyloxy-s-triazine.

5. The adhesive composition of claim 1 wherein the heterocyclic compound is 2,4,6,8-tetraethyleneimino pyrimido [5,4-d] pyrimidine.

6. The adhesive composition of claim 1 wherein the heterocyclic compound is 2,4,6,8-tetraallyloxy pyrimido [5,4-d] pyrimidine.

7. The adhesive composition of claim 2 wherein the heterocyclic compound is 2,4,6-triethyleneimino-s-triazine.

8. The adhesive composition of claim 2 wherein the heterocyclic compound is 2,4,6-triallyloxy-s-triazine.

9. The adhesive composition of claim 2 wherein the heterocyclic compound is 2,4,6,8-tetraethyleneimino pyrimido [5,4-d] pyrimidine.

10. The adhesive composition of claim 2 wherein the heterocyclic compound is 2,4,6,8-tetraallyloxy pyrimido [5,4-d] pyrimidine.

11. The adhesive composition of claim 2 which contains as an additional ingredient, a stabilizer selected from the group consisting of sultones and sulfur dioxide.

12. The adhesive composition as claimed of claim 2 wherein the weight of the heterocyclic compound is between about 0.1% and about 20% of the total weight of the adhesive composition.

13. The adhesive composition of claim 2 wherein the weight of heterocyclic compound is between about 1% and about 5% of the weight of the adhesive composition.

14. The adhesive composition of claim 2 wherein the composition is in a two-part form, a first part containing the monomeric ester of 2-cyanocrylic acid, and a second part containing the heterocyclic compound dissolved or dispersed in an organic solvent.

15. A process for bonding surfaces with an adhesive composition comprising a monomeric ester of 2-cyanoacrylic acid which comprises:

(a) uniformly distributing in said adhesive, or on at least one of said surfaces, a heterocyclic compound selected from the group consisting of heterocyclic compounds of the following formulae

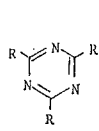 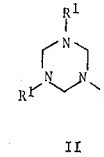 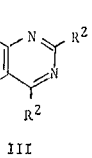

I    II    III wherein each $R^1$ radical is selected from the group consisting of: hydrogen; unsaturated aliphatic residues containing less than about 6 carbon atoms; —CO—CH=CH$_2$; —CO—CCl=CH$_2$;

—SO$_2$—CH=CH$_2$ provided at least two of the $R^1$ groups are other than hydrogen; and each R and $R^2$ radical is selected from the group consisting of: hydrogen; unsaturated aliphatic residues containing less than about 6 carbon atoms; —O—CH=CH$_2$; —O—CH$_2$—CH=CH$_2$; —O—CH=CHCl; —O—CH=CH—CH$_2$Cl;

—SO$_2$—CH=CH$_2$ and

provided at least two of the R and $R^2$ groups are other than hydrogen;

(b) applying said adhesive to at least one of said surfaces;

(c) placing said surfaces in contact until said adhesive cures and bonds said surfaces together.

16. The process of claim 15 wherein the ester of 2-cyanoacrylic acid corresponds to the formula

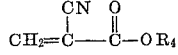

wherein $R^4$ is a $C_1$ to $C_{16}$ alkyl, cyclohexyl or phenyl group.

17. The process of claim 16 wherein the heterocyclic compound is 2,4,6,8-tetraallyloxy pyrimido [5,4-d] pyrimidine.

18. The process of claim 16 wherein the heterocyclic compound is 2,4,6-triethyleneimino-s-triazine.

19. The process of claim 16 wherein the heterocyclic compound is 2,4,6-triallyloxy-s-triazine.

20. The process of claim 16 wherein the heterocyclic compound is 2,4,6,8-tetraethyleneimino pyrimido [5,4-d] pyrimidine.

References Cited

UNITED STATES PATENTS

| | | | |
|---|---|---|---|
| 3,163,647 | 12/1964 | Schaefer et al. | 260—85.5 R |
| 3,178,379 | 4/1965 | Wicker et al. | 260—78.4 N |
| 3,260,637 | 7/1966 | von Bramer | 260—78.4 N |

HARRY WONG, Jr, Primary Examiner

U.S. Cl. X.R.

117—123, 124, 132, 138.8, 148; 260—31.8 R, 78.5 N, 881